US006947656B2

(12) United States Patent
Kim et al.

(10) Patent No.: US 6,947,656 B2
(45) Date of Patent: Sep. 20, 2005

(54) VARIABLE OPTICAL ATTENUATOR WITH TUNABLE WAVELENGTH SELECTIVITY

(75) Inventors: Chang-Kyu Kim, Daejeon (KR); Myung Lae Lee, Daejeon (KR); Chi Hoon Jun, Daejeon (KR); Chang Auck Choi, Daejeon (KR); Youn Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 10/412,580

(22) Filed: Apr. 14, 2003

(65) Prior Publication Data

US 2004/0096177 A1 May 20, 2004

(30) Foreign Application Priority Data

Nov. 15, 2002 (KR) ................................. 10-2002-0070965

(51) Int. Cl.[7] .................................................. G02B 6/00
(52) U.S. Cl. .......................................... 385/140; 385/18
(58) Field of Search .................. 385/18, 140; 359/337, 359/578, 862

(56) References Cited

U.S. PATENT DOCUMENTS

| | | | |
|---|---|---|---|
| 6,149,278 A | * 11/2000 | Mao et al. | 359/862 |
| 6,163,643 A | 12/2000 | Bergmann et al. | |
| 6,172,801 B1 | * 1/2001 | Takeda et al. | 359/337 |
| 6,377,718 B1 | 4/2002 | Que et al. | |
| 6,529,673 B1 | * 3/2003 | Liu et al. | 385/140 |
| 6,618,519 B2 | * 9/2003 | Chang et al. | 385/18 |
| 2002/0135879 A1 | * 9/2002 | Pogrebinsky | 359/578 |

FOREIGN PATENT DOCUMENTS

WO  WO 01/75503  10/2001 .......... G02B/26/00

OTHER PUBLICATIONS

K. Aratani; "Process and Design Considerations for Surface Micromachined Beams for a Tuneable Interferometer Array in Silicon"; 1993 IEEE; pp. 230–235.

C. R. Giles, et al.; "A Silicon MEMS Optical Switch Attenuator and its Use in Lightwave Subsytems"; IEEE Journal of Selected Topics in Quantum Electronics, vol. 5, No. 1; Jan./Feb. 1999; pp. 18–25.

* cited by examiner

*Primary Examiner*—Frank G. Font
*Assistant Examiner*—Mary El-Shammaa
(74) *Attorney, Agent, or Firm*—Mayer, Brown, Rowe & Maw LLP

(57) ABSTRACT

A variable optical attenuator with tunable wavelength selectivity includes at least two reflectors disposed parallel to each other at a predetermined angle from an optic axis and driving units connected to said at least two reflectors for allowing the reflectors to move back and forth in a direction perpendicular or parallel to the optic axis or to revolve centering on an axis perpendicular or parallel to the optic axis. Since the variable optical attenuator of the present invention serves as a variable optical attenuator and, at the same time, as a tunable wavelength filter, problems of insertion loss and optical alignment that might be caused by separately installing a variable optical attenuator and a wavelength filter can be effectively prevented. Moreover, by implementing the variable optical attenuator and the tunable wavelength filter by using a single device, the size of a system using the optical attenuator can be reduced.

4 Claims, 4 Drawing Sheets

VARIABLE OPTICAL ATTENUATOR WITH TUNABLE WAVELENGTH SELECTIVITY

FIELD OF THE INVENTION

The present invention relates to a variable optical attenuator; and, more particularly, to a variable optical attenuator with tunable wavelength selectivity which is capable of serving as a variable optical attenuator for continuously controlling a transmitted power and, at the same time, as a tunable wavelength filter for selectively transmitting a certain wavelength.

BACKGROUND OF THE INVENTION

In a DWDM (dense wavelength division multiplexing) optical communications system, 40, 80, or 128 number of channels separated from each other by a wavelength difference of 0.4 nm or 0.8 nm are modulated at several tens of Gbs and then transmitted simultaneously through a single optical fiber, thereby enabling the expansion of a data transmission rate up to several terabytes per second. Since, however, different wavelengths suffer different absorption losses within the optical fiber and, further, optical characteristics of devices employed in the optical communications system, e.g., an optical source, an optical amplifier, a photo detector, a wavelength division multiplexer and demultiplexer, etc., are varied depending on a wavelength involved, there occur differences in optical intensity between the channels. Thus, an optical attenuator has been conventionally employed in order to adjust the differences in optical intensity between the channels.

Conventionally, there exist three types of optical attenuators.

First, there is an optical attenuator which changes continuously a path of light coming from an input fiber in order to adjust an amount of light to be introduced into output fiber. In an optical attenuator of this type, a reflector perpendicular to optic axes of the optical fibers is partially inserted between two optical fibers aligned in a straight line to reflect some portion of the light. In addition to the above-described configuration, it is also possible that two optical fibers are aligned parallel to each other in a direction perpendicular to a reflector. In this configuration, the amount of light that comes from an input fiber and then is reflected to output fiber can be controlled by varying an angle of the reflector. Besides, the distance between two optical fibers can be varied to adjust the amount of diffracted light introduced to an opposite optical fiber. Furthermore, optic axes of two optical fibers can be separated in a direction perpendicular to a propagation direction of light.

However, since this type of optical attenuator using the above-described various attenuation methods does not have wavelength selectivity, it involves steps for separating channels from each other and adjusting differences in optical intensity of the channels. Accordingly, the system structure has been complicated.

Second, there exists an optical attenuator using transmission characteristics of a Fabry-Perot cavity. Specifically, employed in this optical attenuator is the fact that a transmittance for a certain wavelength is differed as a distance between two reflectors is changed. If a reflectance of the reflectors is high, a transmittance of a Fabry-Perot cavity for a certain channel near a resonant wavelength gets rapidly changed as a function of the distance between reflectors though a channel selectivity is increased. Accordingly, it is required to regulate the distance between the reflectors very minutely, which proves to be difficult and troublesome. If the reflectance of the reflectors is low, on the other hand, the gradient of transmittance relative to the distance between reflectors is lowered, so that a transmitted power can be easily adjusted. However, the channel selectivity is decreased that light of neighboring channels can be transmitted concurrently. Thus, it is required to separate the channels from each other as in the case of the first type of optical attenuator.

Thirdly, there is an optical attenuator using a Faraday effect. In this type of attenuator, light is polarized by a polarizer at an input terminal, and then the polarization direction changes while the light passes through a material having a Faraday effect. A transmitted power is controlled by adjusting an polarization angle of the light relative to a polarizer located at an output terminal. In this method, however, light having only one specific polarization direction can be transmitted through the polarizer at the input terminal, so that loss rate of randomly polarized light reaches 50% or more. Further, in case polarized light emitted from a laser is employed, there exists a necessity for arranging the polarizer at the input terminal parallel to a polarization state of the laser. Furthermore, since it is very difficult to arrange all of the to-be-reflected light to be perpendicular to the to-be-transmitted light, the third type of optical attenuator also requires a process for separating the channels from each other by employing an additional device, as in the above-cited two cases.

SUMMARY OF THE INVENTION

It is, therefore, an object of the present invention to provide a variable optical attenuator with tunable wavelength selectivity which is able to serve as a variable optical attenuator for continuously controlling a transmitted power and, at the same time, as a tunable wavelength filter for selectively transmitting a certain wavelength.

In accordance with the present invention, there is provided a variable optical attenuator with tunable wavelength selectivity including at least two reflectors disposed parallel to each other at a predetermined angle from an optic axis and driving units connected to said at least two reflectors for allowing the reflectors to move back and forth in a direction perpendicular or parallel to the optic axis or to revolve centering on an axis perpendicular or parallel to the optic axis, wherein the variable optical attenuator is installed between optical fibers or optical waveguides.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF PREFERRED EMBODIMENTS

Figure 1:
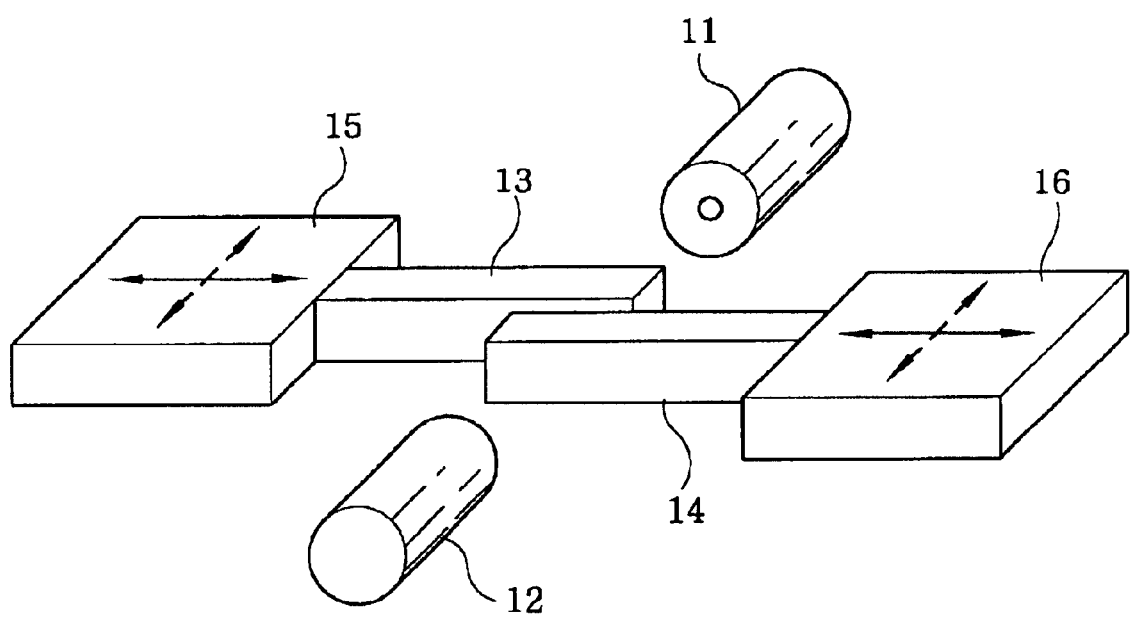
FIG. 1 illustrates a variable optical attenuator capable of adjusting its wavelength selectivity in accordance with a preferred embodiment of the present invention.

Referring to FIG. 1, there is provided a variable optical attenuator with tunable wavelength selectivity in accordance with a preferred embodiment of the present invention.

As shown in FIG. 1, two optical fibers (or waveguides) 11 and 12 are arranged in a manner that their optic axes are aligned in a straight line. The variable optical attenuator includes two reflectors 13 and 14 disposed opposite to each other in a predetermined distance between the two optical fibers 11 and 12, and two driving units 15 and 16 connected to the reflectors 13 and 14, respectively, for linearly moving the reflectors 13 and 14 in a direction perpendicular or parallel to the optic axis or revolving the reflectors 13 and 14 relative to an axis perpendicular or parallel to the optic axis.

The driving units 15 and 16 drive the reflectors 13 and 14 to move back and forth in a direction perpendicular to the optic axis or to revolve centering on an axis parallel to the optic axis, thereby adjusting an area on which the beam profile overlaps with a Fabry-Perot cavity. A light attenuation level can be adjusted by changing the area of the overlapping area. Further, the driving units 15 and 16 minutely controls the reflectors 13 and 14 to move back and forth in the direction parallel to the optic axis or to rotate centering on an axis perpendicular to the optic axis, thereby varying an effective cavity length. A resonant mode at which light transmission occurs can be adjusted by changing such an effective cavity length.

Though the variable optical attenuator is formed of two reflectors 13 and 14 and two driving units 15 and 16 therefor in the preferred embodiment of the present invention, it is also preferable that the variable optical attenuator is composed of more than two reflectors and the corresponding number of driving units therefor.

Figure 2:
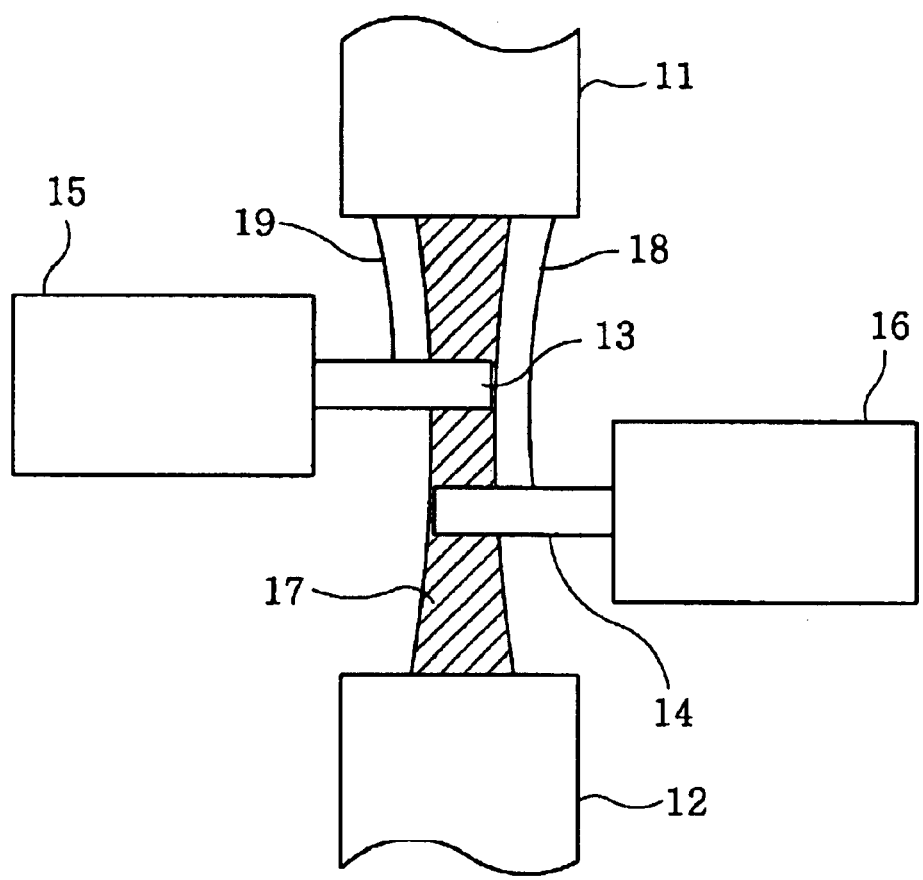
FIG. 2 describes the variable optical attenuator in accordance with the present invention which is operated to transmit only a part of incident light, the attenuator being viewed from a direction perpendicular to an optic axis.

Referring to FIG. 2, there is described the variable optical attenuator of the present invention viewed from the direction perpendicular to the optic axis, in which the reflectors 13 and 14 are linearly driven in the direction perpendicular to the optic axis in order to allow only a certain portion of incident light to be transmitted.

In FIG. 2, light coming from the optical fiber 11 or 12 has a Gaussian beam type cross section. On an optical path, there exists a central area 17 where the two reflectors 13 and 14 are overlapped. In the present invention, the central area 17 having the Fabry-Perot cavity formed thereon is defined as a resonator region while areas 18 and 19 other than the resonator region are respectively referred to as a left and a right reflector region. A Fabry-Perot cavity formed at the central area 17 is serving to filter through only the light having a wavelength satisfying a resonance condition but to reflect light having a wavelength other than that satisfying the resonance condition, wherein the resonance condition is dependent on a distance between the reflectors 13 and 14. The size of the resonator region 17 is changed by movements of the reflectors 13 and 14, which are driven by the driving units 15 and 16, respectively, so that a transmitted power of the variable optical attenuator is continuously changed.

Herein, a resonant wavelength ($\lambda_{FP}$) is determined by an effective cavity length ($L_{eff}$) between the reflectors 13 and 14 as shown in the following Eq. 1.

$$L_{eff}=m\lambda_{FP}/2 \text{ (m represents a natural number)} \qquad \text{Eq. 1}$$

Accordingly, the effective cavity length should be set by considering a to-be-transmitted wavelength of light. Since a distance between neighboring resonant wavelengths is narrowed as m increases, it is preferable that m is set to have as small a value as possible in order to adjust the distance between the neighboring resonant wavelengths to be larger than the whole wavelength band for use in an optical transmission system. A transmitted power at a resonant wavelength is determined by a reflectance and an absorption of each of the reflectors 13 and 14 as well as an absorption of a material existing between the two reflectors 13 and 14. In order to maximize a transmittance of the Fabry-Perot cavity, it is preferable that the two reflectors 13 and 14 are symmetrically fabricated in a manner that they have the same reflectance.

The left and the right reflector regions 18 and 19 respectively having a single reflector located on the optical path reflect all the light corresponding to high-reflectance wavelength bands.

Next, variation of transmitted power at a resonant wavelength will be described hereinafter with reference to FIGS. 3A to 3C. The transmitted power is varied by changing locations of the reflectors 13 and 14, which are driven by the driving units 15 and 16.

Figure 3A:
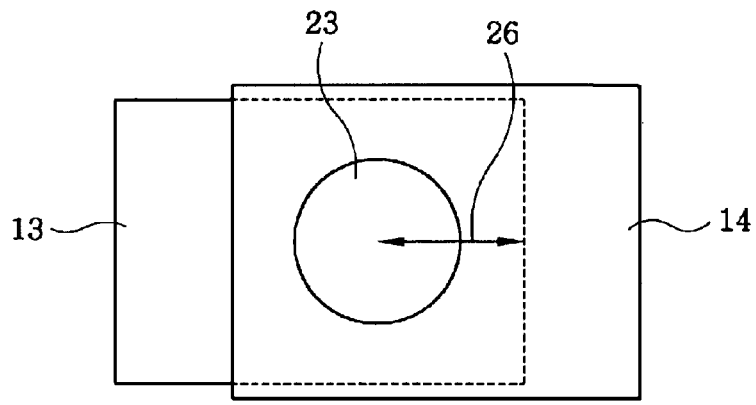
FIGS. 3A to 3C respectively exemplifies a transmitted power of a resonant wavelength relevant to relative positions of reflectors in the variable optical attenuator in accordance with the present invention.
Figure 3B:
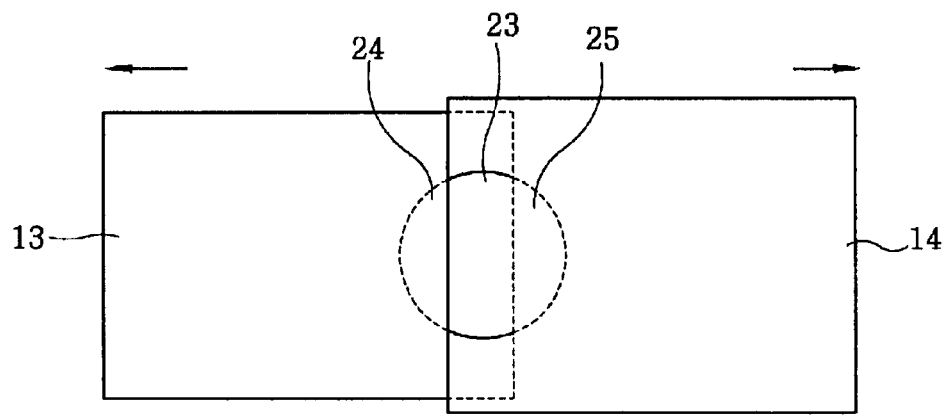
Figure 3C:
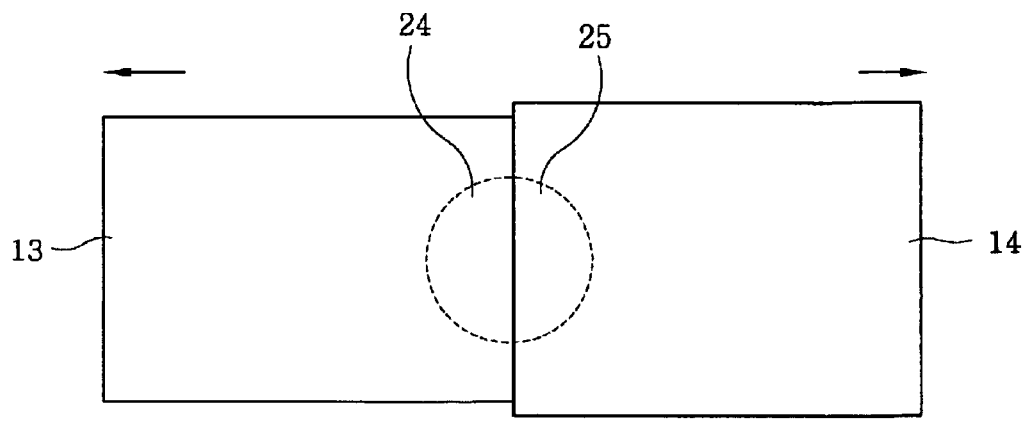

FIGS. 3A to 3C illustrate the transmission area corresponding to a resonant wavelength observed at an output terminal. The transmitted power at the resonant wavelength differs depending on relative positions of the reflectors in the variable optical attenuator in accordance with the present invention.

As shown in FIG. 3A, if both the two reflectors 13 and 14 are positioned to be overlapped over the whole cross-section of the optical path, the light having the resonant wavelength is selectively transmitted while light having another wavelength is reflected.

If the reflectors 13 and 14 are moved outwardly by the driving units 15 and 16, the transmission area 23 is reduced (i.e., only a part of the beam profile overlaps with the resonator region). Thus, at the transmission area 23, only the light with the resonant wavelength is transmitted and light with a wavelength other than the resonant wavelength is reflected while at the left and the right reflector regions 24 and 25 all the light is reflected regardless of their wavelengths.

If the reflectors 13 and 14 are moved outwardly by the driving units 15 and 16 until end portions of the two reflectors 13 and 14 meet, there doesn't exist the resonator region, i.e., there is no region where the two reflectors 13 and 14 are overlapped. At this time, all the light is reflected by the reflectors 13 and 14.

As described above, the transmitted power at the resonant wavelength is determined by the size of the transmission area 23 where the cross section of light coming from the optical fibers (or optical waveguides) 11 or 12 overlaps with the reflectors 13 and 14 at the same time.

Figure 4:
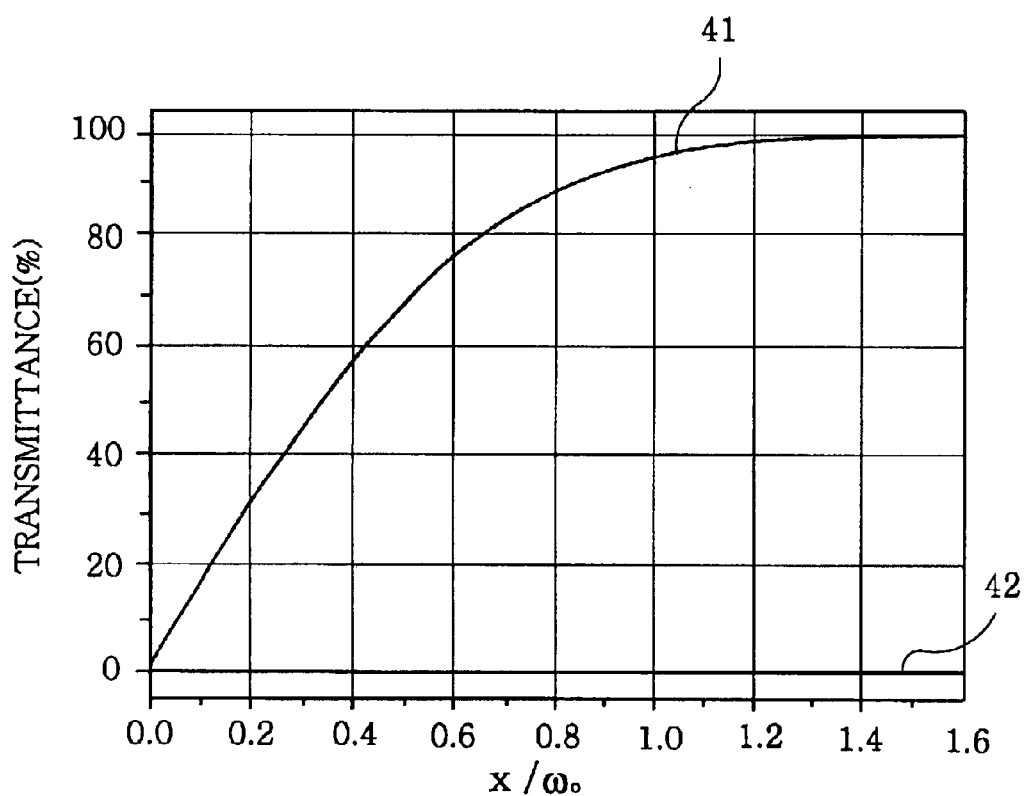
FIG. 4 provides a graph describing a transmittance relevant to relative positions of the reflectors in the variable optical attenuator in accordance with the present invention.

For example, assume that x refers to a distance 26 between the center of light and an end portion of the reflector 13 while $\omega_0$ represents a radius of light having a Gaussian beam shape. If the two reflectors 13 and 14, each having a reflectance of, e.g., 99.9%, are moved from the center of the light by a same distance in a left and a right direction, respectively, a transmittance is changed relative to $x/\omega_0$ as shown in FIG. 4, wherein a reference number 41 designates a transmittance at a resonant wavelength and a reference number 42 designates a transmittance at a wavelength other than the resonant wavelength.

Each of the reflectors 13 and 14 is made of a metal film, a dielectric film, an organic film, a semiconductor film, a combination thereof, or a combination of these films and an air gap. The reflectors 13 and 14 transmit some of incident light coming from the optical fiber 11 or 12, thereby allowing for a formation of a resonator region when they are disposed opposite to each other. As the reflectance of each of the reflectors 13 and 14 increases, the difference in the transmitted power at the resonant wavelength also increases between the resonator region 17 and the left and the right reflector regions 18 and 19 while a wavelength width of light transmitted through the resonator region is narrowed. Thus, reflectors used in the variable optical attenuator preferably have a high reflectance in order to implement a variable optical attenuator exhibiting an improved channel selectivity and a low insertion loss. It is preferable that at least one of the reflectors 13 and 14 is a distributed Bragg reflector (DBR) or a 2- or 3-dimensional photonic crystal structure in order to increase the reflectance. The height and the width of each of the reflectors 13 and 14 are all set to be larger than the diameter of the incident light in order to control all the light inputted to the variable optical attenuator.

Further, it is preferable that at least one of the reflectors 13 and 14 has a 1- or 2-dimensional lens-shaped surface or an additional 1- or 2-dimensional lens-shaped surface structure is inserted between optical fiber and reflector, whereby it becomes possible to reduce a diffraction loss of light. Further, by tilting the reflectors 13 and 14 in a predetermined degree from a right angle to optic axis, it can be prevented that the reflected light is returned to the optical fibers 11 and 12, functioning as noises.

Further, end portions of the reflectors 13 and 14 may have a shape selected from a line, a curve, and a polygon in order to control a transmitted power relative to a displacement of the reflectors 13 and 14 and reduce a difference in an attenuation level due to polarization.

The driving units 15 and 16 allow the reflectors 13 and 14 to move back and forth or to revolve centering on the optic axis by employing a heat, a current, an electromagnetic force, an electrostatic force, a magnetic force or a piezoelectric force. At the time of adjusting the optical attenuation level, the driving units 15 and 16 may drive both of the reflectors 13 and 14 or may drive only one of the reflectors 13 and 14 with the other being fixed on a certain position.

The variable optical attenuator of the present invention can perform an optical switching operation for a certain wavelength by repeatedly switching from a state for transmitting whole light having the resonant wavelength but reflecting light with a wavelength other than the resonant wavelength, as shown in FIG. 3A, to a state for reflecting all the light inputted thereto, as shown in FIG. 3C.

Furthermore, the variable optical attenuator of the present invention can serve as a tunable wavelength filter by fixing a distance between a center of light and the end portions of the reflectors 13 and 14 such that the optical path and the resonator region fully overlap with each other and changing the resonant wavelength by minutely moving the driving units 15 and 16, i.e., the reflectors 13 and 14, in parallel to the optic axis.

Though transmitted power is controlled by moving the reflectors 13 and 14 in the variable optical attenuator in accordance with the present invention, it is also possible to additionally control the transmitted power by setting the reflectors 13 and 14 to change its reflectance by using a heat, a current, a voltage, light, an electromagnetic wave or a pressure while concurrently moving the reflectors 13 and 14 via the driving units. Furthermore, the transmitted power can also be controlled without moving the reflectors 13 and 14 but by setting the reflectors to change its reflectance by employing a heat, a current, a voltage, light, an electromagnetic wave or a pressure.

As described above, the variable optical attenuator of the present invention serves as a variable optical attenuator for continuously controlling the transmitted power and, at the same time, as a tunable wavelength filter for selectively transmitting a certain wavelength. Therefore, problems of insertion loss and optical alignment that might be caused by separately installing a wavelength filter and an optical attenuator can be effectively prevented.

Moreover, the present invention enables implementation of a variable optical attenuator and a tunable wavelength filter just by using a single device. As a result, the size of a system using the optical attenuator can be reduced.

While the invention has been shown and described with respect to the preferred embodiments, it will be understood by those skilled in the art that various changes and modifications may be made without departing from the spirit and scope of the present invention as defined in the following claims.

What is claimed is:

1. A variable optical attenuator with tunable wavelength selectivity comprising:
   at least two reflectors disposed parallel to each other at a predetermined angle from an optic axis, said optic axis being formed by aligning the optic axes of two optical waveguides or optical fibers in a substantially straight line; and
   driving units connected to said at least two reflectors for allowing the reflectors to move back and forth in a direction perpendicular or parallel to the optic axis or to revolve centering on an axis perpendicular or parallel to the optic axis,
   wherein the variable optical attenuator is installed between the optical waveguides or the optical fibers; and
   wherein a Fabry-Perot cavity overlaps with an optical path at a transmission area, light having a resonant wavelength satisfying a resonance condition is transmitted through the transmission area while light having a non-resonant wavelength not satisfying the resonance condition is reflected at the transmission area, and the resonance condition is dependent on a distance between the reflectors.

2. The attenuator of claim 1, wherein the resonant wavelength satisfying the resonance condition is varied as the reflectors are moved back and forth in a direction parallel to the optic axis or revolved centering on an axis perpendicular to the optic axis by the driving units.

3. The attenuator of claim 1, wherein the transmission area is varied as the reflectors are moved back and forth in a direction perpendicular to the optic axis or revolved centering on an axis parallel to the optic axis, and transmitted power is changed with a variation of the transmission area.

4. The attenuator of claim 2, wherein the attenuator transmits the light having the resonant wavelength satisfying the resonance condition if the transmission area covers whole cross-section of the optical path but reflects all of incident light if the transmission area does not exist.

* * * * *

UNITED STATES PATENT AND TRADEMARK OFFICE
CERTIFICATE OF CORRECTION

PATENT NO.       : 6,947,656 B2  
APPLICATION NO.  : 10/412580  
DATED            : September 20, 2005  
INVENTOR(S)      : Chang-Kyu Kim et al.

It is certified that error appears in the above-identified patent and that said Letters Patent is hereby corrected as shown below:

Col. 6, line 58, Claim 4, – "The attenuator of claim 2," should be --The attenuator of claim 1,--

Signed and Sealed this

Second Day of October, 2007

JON W. DUDAS  
*Director of the United States Patent and Trademark Office*